United States Patent
Carlavan et al.

(10) Patent No.: US 10,356,443 B2
(45) Date of Patent: Jul. 16, 2019

(54) IMAGE COMPRESSION METHOD ALLOWING A SET COMPRESSION QUALITY TO BE OBTAINED

(71) Applicant: THALES, Courbevoie (FR)

(72) Inventors: Mikael Carlavan, Cannes la Bocca (FR); Frédéric Falzon, Cannes la Bocca (FR)

(73) Assignee: THALES, Courbevoie (FR)

( * ) Notice: Subject to any disclaimer, the term of this patent is extended or adjusted under 35 U.S.C. 154(b) by 272 days.

(21) Appl. No.: 15/338,245

(22) Filed: Oct. 28, 2016

(65) Prior Publication Data

US 2017/0150182 A1    May 25, 2017

(30) Foreign Application Priority Data

Nov. 20, 2015   (FR) ...................................... 15 02430

(51) Int. Cl.
```
G06K 9/46       (2006.01)
H04N 19/91      (2014.01)
H04N 19/126     (2014.01)
H04N 19/124     (2014.01)
H04N 19/176     (2014.01)
H04N 19/63      (2014.01)
H04N 19/64      (2014.01)
```
(52) U.S. Cl.
CPC .......... *H04N 19/91* (2014.11); *H04N 19/124* (2014.11); *H04N 19/126* (2014.11); *H04N 19/176* (2014.11); *H04N 19/63* (2014.11); *H04N 19/64* (2014.11)

(58) Field of Classification Search
None
See application file for complete search history.

(56) References Cited

U.S. PATENT DOCUMENTS

| | | | |
|---|---|---|---|
| 2011/0268182 A1* | 11/2011 | Joshi | H04N 19/647 |
| | | | 375/240.03 |
| 2013/0251032 A1* | 9/2013 | Tanaka | H04N 19/44 |
| | | | 375/240.03 |

FOREIGN PATENT DOCUMENTS

| | | |
|---|---|---|
| EP | 1 037 470 A1 | 9/2000 |
| EP | 1 566 969 A1 | 8/2005 |
| FR | 3 013 490 A1 | 5/2015 |

OTHER PUBLICATIONS

Jun Sun et al., "Rate-Distortion Analysis of Dead-Zone Plus Uniform Threshold Scalar Quantization and its Application Part II: Two-Pass VBR Coding for H.264/AVC," IEEE Transactions on Image Processing, vol. 22, No. 1, Jan. 1, 2013, pp. 215-228, XP011492251.

(Continued)

*Primary Examiner* — Stephen P Coleman
(74) *Attorney, Agent, or Firm* — Baker & Hostetler LLP

(57) ABSTRACT

An image compression method comprises the following steps applied to at least one image: decorrelating the image by applying thereto a mathematical transform to obtain a set of coefficients, decomposing the image into blocks and, for each block of the image, quantizing the coefficients using a dead-zone uniform scalar quantizer having a semi-dead zone of size T and a quantization step size $\Delta$, and coding the quantized coefficients, the size T of the semi-dead zone of the scalar quantizer being determined by minimizing the difference between an estimated quantization distortion D(T), dependent at least on size T, and a target quantization distortion $D_c$.

18 Claims, 2 Drawing Sheets

(56) References Cited

OTHER PUBLICATIONS

Jinhua Yu, "Advantages of uniform scalar dead-zone quantization in image coding system," 2004 International Conference on Communications, Circuits and Systems, vol. 2, Chengdu, China, Jun. 27, 2004, pp. 805-808, XP010731902.
Gary J. Sullivan et al., "On Dead-Zone Plus Uniform Threshold Scalar Quantization," Visual Communications and Image Processing, vol. 5960, Jul. 12, 2005, pp. 1041-1052, XP030080946.
Yizhou Duan et al., "Efficient dead-zone plus uniform threshold scalar quantization of generalized Gaussian random variables," Visual Communications and Image Processing (VCIP), Nov. 6, 2011, pp. 1-4, XP032081340.
Michael W. Macellin et al., "An overview of quantization in JPEG 2000," Signal Processing: Image Communication, vol. 17, 2002, pp. 73-84.
Pica, et al., "HVS Based Perceptual Video Encoders", 2006.

\* cited by examiner

IMAGE COMPRESSION METHOD ALLOWING A SET COMPRESSION QUALITY TO BE OBTAINED

CROSS-REFERENCE TO RELATED APPLICATIONS

This application claims priority to foreign French patent application No. FR 1502430, filed on Nov. 20, 2015, the disclosure of which is incorporated by reference in its entirety.

FIELD OF THE INVENTION

The invention relates to the field of image compression and pertains to an image compression method allowing a set compression quality to be obtained, without particular constraint on throughput.

The invention is advantageously applicable to the compression of images of large size, in particular images taken by an observation satellite.

BACKGROUND

Known image compression methods are most often based on models in which both compression quality (or the distortion engendered by the compression operation) and the throughput obtained after compression are factors. The drawback of these solutions is that they control compression quality via a subordinate quantity, namely throughput, and most often only allow overall quality (of all the image) to be controlled and not local quality.

For applications that are not subject to throughput constraints, there is a need for an image compression method that allows a target quality to be obtained in each zone or block of the image independently of throughput. Such applications especially include the transmission of images from an observation satellite to a ground station. The images captured by an observation satellite correspond to images of large size for which the compression quality is a preponderant parameter, whereas the transmission channel of the downlink between the satellite and the ground is most often compatible with higher transmission throughputs than is the case in other wireless transmission applications.

Moreover, the image compression methods described in documents FR3013490 and EP1037470 are known.

The method described in document FR3013490 has the drawback of employing a complex iterative process that is difficult to reconcile with an implementation on a device of limited resources. The method described in document EP1037470 is based on modelling distortion, which depends on throughput.

SUMMARY OF THE INVENTION

The invention provides an image compression method based on a distortion model in which throughput is not a factor.

One advantage of this method is that it allows both the overall and local quality of the compressed image to be controlled, and it requires no a priori knowledge of the image to be compressed.

One subject of the invention is an image compression method comprising the following steps applied to at least one image:

Decorrelating the image by applying thereto a mathematical transform so as to obtain a set of coefficients, Decomposing the image into blocks and, for each block of the image, Quantizing said coefficients using a dead-zone uniform scalar quantizer having a semi-dead zone of size T and a quantization step size $\Delta$, and Coding the quantized coefficients, The size T of the semi-dead zone of the scalar quantizer being determined by minimizing the difference between an estimated quantization distortion D(T), dependent at least on said size T, and a target quantization distortion $D_c$.

According to one particular aspect of the invention, the estimated quantization distortion corresponds to a mean error made while quantizing said coefficients using the dead-zone uniform scalar quantizer.

According to one particular aspect of the invention, the estimated quantization distortion is determined by summing a first term representative of the quantization distortion engendered by the zeroing of coefficients the modulus of which is less than the size T of the semi-dead zone and a second term representative of the quantization distortion engendered by the quantization, with the quantization step size $\Delta$, of coefficients having a modulus greater than or equal to the size T of the semi-dead zone.

According to one particular aspect of the invention, said second term is determined by the following calculation:

$$\alpha^2 M(T) \frac{T^2}{12},$$

where $\alpha$ is a preset parameter of the quantizer and M(T) is the number of coefficients the modulus of which is greater than or equal to the size T of the semi-dead zone of the scalar quantizer.

According to one particular variant, the image compression method according to the invention furthermore comprises, for each block, setting the quantization step size $\Delta$ equal to the determined size T of the semi-dead zone weighted by a preset parameter $\alpha$.

The parameter $\alpha$ may be chosen in the interval [0.2; 3] and may be set independently for each block.

The parameter $\alpha$ may be set to an identical value for all the blocks of the image.

According to one particular aspect of the invention, the method may furthermore comprise a step of coding the parameter $\alpha$ losslessly.

According to one particular aspect of the invention, said mathematical transform is a wavelet transform or a discrete cosine transform.

According to one particular aspect of the invention, the quantized coefficients are coded using a source coder, for example an entropy coder.

According to one particular variant, the method according to the invention furthermore comprises, for each block, a step of coding the size T of the semi-dead zone losslessly.

Another subject of the invention is an image coder comprising means configured to implement the image compression method according to the invention.

Another subject of the invention is an image coder for coding at least one image comprising:

a first module configured to decorrelate the image by applying thereto a mathematical transform so as to obtain a set of coefficients, decompose the image into blocks and, for each block of the image, a dead-zone uniform scalar quantizer of semi-dead zone of size T and of quantization step size Δ for quantizing said coefficients, and a source coder for coding the quantized coefficients, the size T of the semi-dead zone of the scalar quantizer being determined by minimizing the difference between an estimated quantization distortion D(T), dependent at least on said size T, and a target quantization distortion $D_c$.

Another subject of the invention is a satellite comprising an image coder according to the invention.

The satellite according to the invention may furthermore comprise means for transmitting to the ground the coded quantized coefficients and/or the size T of the coded semi-dead zone and/or the coded parameter α.

Yet another subject of the invention is a computer program including instructions for executing the image compression method according to the invention, when the program is executed by a processor.

Yet another subject of the invention is a processor-readable storage medium on which is stored a program including instructions for executing the image compression method according to the invention, when the program is executed by a processor.

BRIEF DESCRIPTION OF THE DRAWINGS

Other features and advantages of the present invention will become more clearly apparent on reading the following description with reference to the appended drawings, which show.

DETAILED DESCRIPTION

Figure 1:
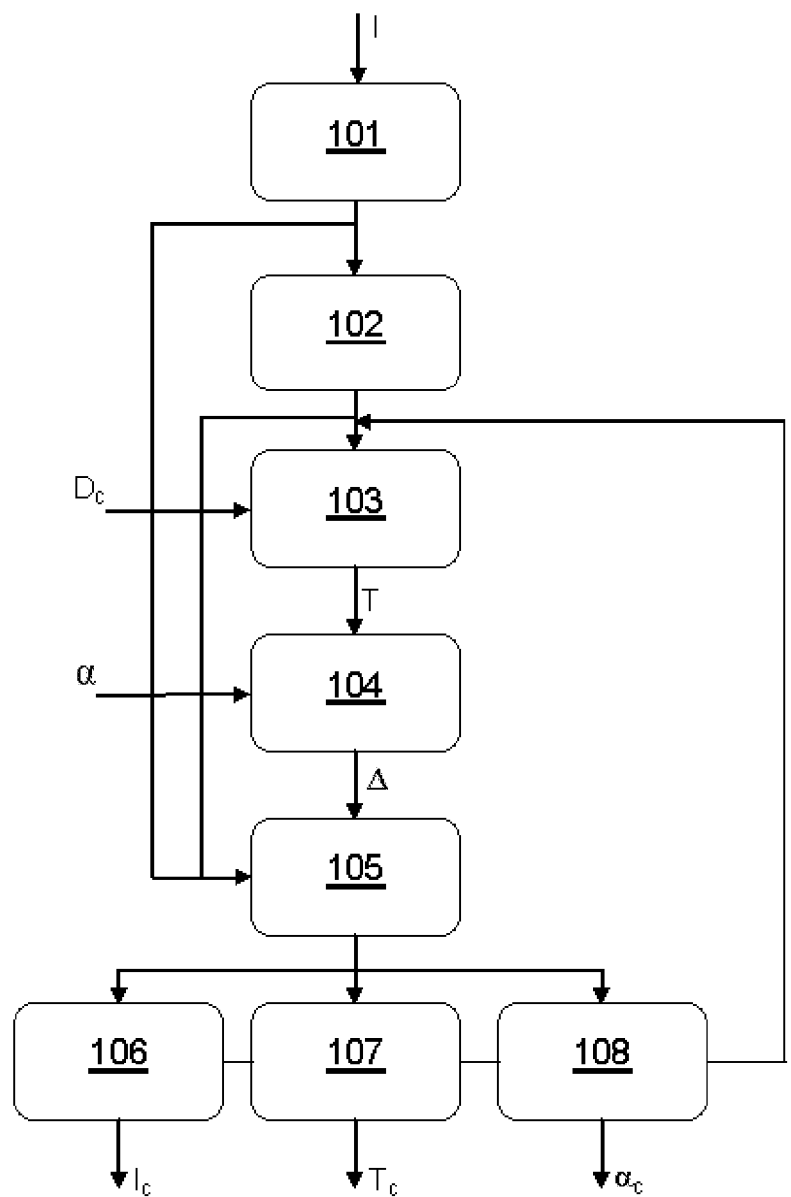
FIG. 1, a flowchart detailing the steps of the image compression method according to the invention, FIGS. 2a and 2b, two exemplary binary frames used for the transmission of the results of compression of an image, and FIG. 3, a schematic illustrating an image coder according to the invention.

FIG. 1 illustrates, in a flowchart, the steps of the image compression method according to the invention. The method is described for compression of an image I to a coded image $I_c$. For an image stream comprising a succession of captured images, the method is applied sequentially and identically to each image of the stream.

This method comprises a first step 101 of decorrelating the image I by applying an orthogonal or biorthogonal mathematical transform allowing the information contained in the image to be decorrelated, for example by analysis of its frequency content. The used mathematical transform may typically be a discrete cosine transform (DCT) or a wavelet transform or any other equivalent mathematical transform. The used mathematical transform may, for example, allow a set of coefficients representative of the frequency content of the image I to be obtained. The used mathematical transform may, moreover, allow a parsimonious representation of the image to be obtained, i.e. one in which the modulus of the ordered transformed coefficients rapidly decreases.

The image I is then decomposed 102 into blocks of pixels corresponding to zones of the image. These blocks are, for example, equal to 8 pixels by 8 pixels in size but may be of different sizes provided that they allow the image I to be completely tiled. A block may also be no less than the image in its entirety.

The following steps of the compression method are applied in succession to each block of the image I obtained by the decomposition 102.

Beforehand, the coefficients of the transform applied in step 101 are rearranged in order to reorder them so that each block of coefficients of the transformed image corresponds to one block of the decomposition 102 of the image.

The blocks of coefficients are subsequently quantized 104 by a dead-zone uniform scalar quantizer of parameters T, corresponding to the size of the semi-dead zone, and Δ, corresponding to the quantization step size.

It will be recalled that the function of a dead-zone uniform scalar quantizer is to quantize a real number in the following way:

Numbers the absolute value of which is less than T are zeroed, i.e. set to zero, and Numbers the absolute value of which is greater than or equal to T are quantized depending on the quantization step size Δ.

The document "an overview of quantization in JPEG 2000, Michael Marcellin et al., Signal Processing: Image Communication, 2002" describes the use of such a dead-zone uniform scalar quantizer in the context of the JPEG 2000 image compression standard.

In a step 103 prior to the scalar quantization operation 105, the optimal value of the parameter T, i.e. the value that allows a quantization distortion as close as possible to a target distortion $D_c$ to be obtained, is determined.

The quantization distortion corresponds to the mean quadratic error made while quantizing the coefficients using the dead-zone uniform scalar quantizer.

This quantization distortion may be estimated as the sum of two terms. The first term corresponds to the distortion engendered by the zeroing of coefficients the modulus of which is less than T. The second term corresponds to the distortion engendered by the quantization, with the quantization step size Δ, of coefficients the modulus of which is greater than or equal to T.

Equation (1) is one example of a relationship that may be used to estimate quantization distortion based on this model.

$$D(T) = \frac{1}{N}\left(D_0(T) + \alpha^2 M(T)\frac{T^2}{12}\right) \quad (1)$$

The first term $D_0(T)$ corresponds to the distortion engendered by the zeroing of coefficients $C_i$ the modulus of which is less than T, and it may be calculated using Equation (2).

$$D_0(T) = \sum_{|C_i|<T} |C_i|^2 \quad (2)$$

The second term $$\alpha^2 M(T)\frac{T^2}{12}$$

is an estimate of the distortion engendered by the quantization, with the quantization step size Δ, of coefficients the modulus of which is greater than or equal to T.

α is a parameter of the scalar quantizer; its value preferably lies in the interval [0.2; 3].

M(T) is the number of coefficients the modulus of which is greater than or equal to T obtained at the end of step 101 for a given block comprising N coefficients.

Step 103 then consists in seeking the value of the parameter T that allows the error between D(T) and $D_c$ to be minimized, in a block comprising N coefficients. The error between D(T) and $D_c$ may be a quadratic error.

In a step 104, the quantization step size $\Delta=\alpha \cdot T$ is then determined using the parameter $\alpha$.

The parameter $\alpha$ has an influence on the final throughput obtained for the compressed image $I_c$. A value of this parameter close to 1 engenders a low throughput whereas a value far from 1 engenders a higher throughput.

The choice of this parameter reflects a compromise between the diversity of the content of the image and the obtained final throughput. A parameter $\alpha$ chosen in the interval [0.2;3] allows a low throughput for a wide variety of images.

The parameter $\alpha$ may be set for all of one image or for a plurality of images but it may also vary from one block of coefficients to the next. One advantage of using a different parameter $\alpha$ for each block of coefficients is that this allows throughput to be optimized locally.

The coefficients quantified using the scalar quantizer of parameters T (determined in step 104) and $\Delta$ (determined in step 105) are then coded 106 by a source coder, an entropy coder for example.

The parameters T and a of the scalar quantizer may also be coded, by a lossless source coder, an entropy coder for example.

The coded coefficients and the coded parameters of the scalar quantizer may then be transmitted in the form of binary frames to a remote decompression device.

Figures 2A, 2B, 3:
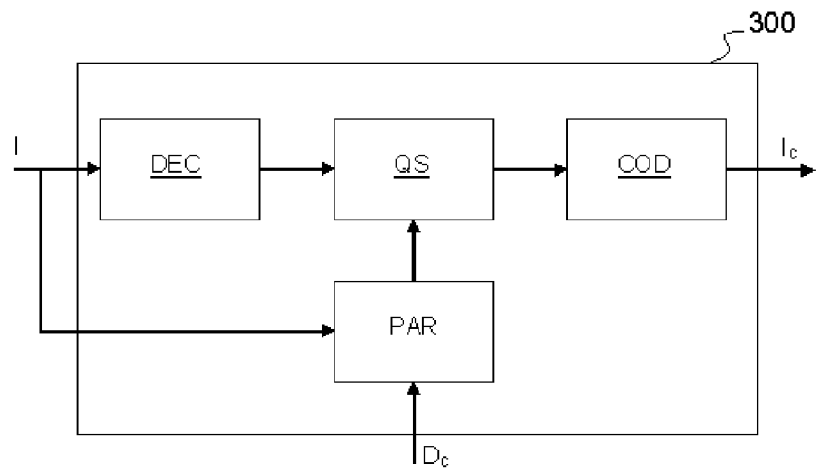

FIGS. 2a and 2b illustrate two examples of binary frames that may be used to form, with a view to their transmission, the coded coefficients.

In the first example, shown in FIG. 2a, the coded coefficients $C_j$, with j varying from 1 to the number N of coefficients per block, are arranged by block $B_i$ and associated, for each block, with a quantization parameter $T_i$. The index i varies from 1 to the number of blocks P in an image. The coded parameter $\alpha$ is for example transmitted at the end of a frame corresponding to an image. It can also be transmitted at another predefined position in the frame, for example in a header.

In the second example, shown in FIG. 2b, a coded parameter $\alpha_i$ is transmitted, for example, at the end of each series of coefficients corresponding to a block $B_i$. Alternatively, this parameter may also be transmitted before the series of coefficients or at any predefined position in the subframe containing the series of coefficients corresponding to a block.

FIG. 3 schematically shows an exemplary image coder 300 according to the invention and suitable for implementing the image compression method according to the invention.

Such a coder 300 receives as input one or more images I. The images I may be images captured by an observation satellite. In this scenario, the coder 300 may be installed in the payload of an observation satellite and interfaced with image-capturing instruments (not shown in FIG. 3). However, the coder 300 may also receive images I captured by any other image-capturing device, such as a video camera. The images I may be stored or pre-recorded with a view to being delivered as input to the coder 300.

The coder 300 includes a first module DEC for decorrelating the image by applying a mathematical transform in accordance with step 101 of the method according to the invention. The coefficients output by the module DEC are rearranged into blocks in accordance with step 102 of the invention. This rearrangement may be carried out by the module DEC or by an additional module allowing the module DEC and the other modules of the coder 300 to interface. A dead-zone uniform scalar quantizer QS receives the coefficients output by the module DEC and performs a scalar quantization step, in accordance with step 105 of the method according to the invention. The scalar quantizer QS receives parameters delivered by a quantization-parameter computer PAR that executes steps 103 and 104 of the method according to the invention depending on a quality setpoint $D_c$ delivered for each block of coefficients to be quantized. A source coder COD, for example an entropy coder, then codes the quantized coefficients output by the scalar quantizer QS and may also code, according to embodiments of the invention, the parameters of the quantizer. The binary stream $I_c$ output by the entropy coder COD is then transmitted to a storage medium or to a satellite-channel or radio-channel transmitting module or to any other means for transmitting by wire or wirelessly or even over fibre-optic, etc.

The exemplary architecture of the coder 300 given in FIG. 3 is presented by way of nonlimiting illustration. Without departing from the scope of the invention, those skilled in the art will be able to envisage different implementations of the compression method according to the invention in a software or hardware coder or a coder incorporating both software and hardware components. In particular, the various modules DEC,QS,COD,PAR may be arranged differently, be decomposed into submodules or in contrast grouped together in one single module.

The modules of the coder 300 according to the invention may be implemented using hardware and/or software components. In this respect, the invention may especially be implemented in the form of a computer program including instructions for its execution. The computer program may be stored on a processor-readable storage medium. The medium may be electronic, magnetic, optical or electromagnetic.

In particular, the invention in its entirety or each module of the coder according to the invention may be implemented by a device comprising a processor and a memory. The processor may be a generic processor, a specific processor, an application-specific integrated circuit (ASIC) or a field-programmable gate array (FPGA).

The device may use one or more dedicated electronic circuits or a general-use circuit. The technique of the invention may be carried out by a reprogrammable computing machine (a processor or a microcontroller for example) executing a program comprising a sequence of instructions, or by a dedicated computing machine.

According to one embodiment, the device comprises at least one computer-readable storage medium (a RAM, ROM, EEPROM, flash memory or a memory in another technology, a CD-ROM, DVD or another optical disc medium, a magnetic cassette, a magnetic strip, a magnetic storage disk, or another storage device or another computer-readable nonvolatile storage medium) coded with a computer program (i.e. a plurality of executable instructions) that, when it is executed by a processor or more than one processors, performs the functions of the embodiments of the invention described above.

By way of example of a hardware architecture suitable for implementing the invention, a device according to the invention may include a communication bus to which are connected a central processing unit or microprocessor (CPU) and a read-only memory (ROM) able to store the programs required to implement the invention; a random-access or cache memory (RAM) containing registers suitable for recording variables and parameters created and modified during the execution of the aforementioned programs; and a communication or input/output (I/O) interface suitable for transmitting and receiving data.

The reference to a computer program that, when it is executed, performs any one of the functions described above, should not be understood as being limited to an application program executed by a single host computer or a single processor. On the contrary, the terms computer program and software are used here in a general sense to refer to any type of computer code (for example a piece of application software, a piece of firmware, a microcode, or any other form of computer instructions) that may be used to program one or more processors to implement aspects of the techniques described here. The software code may be executed by any suitable processor (a microprocessor for example) or processor core or a set of processors, whether they be provided in a single computing device or distributed between a plurality of computing devices (for example such as possibly accessible in the environment of the device). The executable code of each program, allowing the programmable device to implement the processes according to the invention, may be stored, for example, on a hard disk or read-only memory. It may also be downloaded from a remote server. Generally, the one or more programs will possibly be loaded into one of the storage means of the device before being executed. The central unit may control and direct the execution of the software code sections or instructions of the one or more programs according to the invention, which instructions are stored in the hard disk or in the read-only memory or indeed in another of the aforementioned storage components.

The invention claimed is:

1. An image compression method comprising the following steps applied to at least one image, the method being executed by an image coding device:
    receiving at least one image captured by an image-capturing device,
    decorrelating the image by applying thereto a mathematical transform so as to obtain a set of coefficients, and decomposing the image into blocks and, for each block of the image,
    quantizing said coefficients using a dead-zone uniform scalar quantizer having a semi-dead zone of size T and a quantization step size $\Delta$, and
    coding the quantized coefficients to produce a compressed image,
    the size T of the semi-dead zone of the scalar quantizer being determined by minimizing a difference between an estimated quantization distortion D(T), dependent at least on said size T, and a target quantization distortion $D_c$.

2. The image compression method according to claim 1, wherein said mathematical transform is a wavelet transform or a discrete cosine transform.

3. The image compression method according to claim 1, wherein the quantized coefficients are coded using a source coder.

4. The image compression method according to claim 1 further comprising, for each block, a step of coding the size T of the semi-dead zone losslessly.

5. The image compression method according to claim 1, wherein the quantized coefficients are coded using a source coder that comprises an entropy coder.

6. The image compression method according to claim 1 further comprising, for each block, setting the quantization step size $\Delta$ equal to a determined size T of the semi-dead zone weighted by a preset parameter $\alpha$.

7. The image compression method according to claim 6, wherein the parameter $\alpha$ is chosen in an interval [0.2; 3].

8. The image compression method according to claim 6, wherein the parameter $\alpha$ is set independently for each block.

9. The image compression method according to claim 6, wherein the parameter $\alpha$ is set to an identical value for all the blocks of the image.

10. The image compression method according to claim 6 further comprising a step of coding the parameter $\alpha$ losslessly.

11. The image compression method according to claim 1, wherein the estimated quantization distortion corresponds to a mean error made while quantizing said coefficients using the dead-zone uniform scalar quantizer.

12. The image compression method according to claim 11, wherein the estimated quantization distortion is determined by summing a first term representative of the quantization distortion engendered by a zeroing of coefficients a modulus of which is less than the size T of the semi-dead zone and a second term representative of the quantization distortion engendered by the quantization, with the quantization step size $\Delta$, of coefficients having a modulus greater than or equal to the size T of the semi-dead zone.

13. The image compression method according to claim 12, wherein said second term is determined by the following calculation:

$$\alpha^2 M(T) \frac{T^2}{12},$$

where $\alpha$ is a preset parameter of the quantizer and M(T) is a number of coefficients the modulus of which is greater than or equal to the size T of the semi-dead zone of the scalar quantizer.

14. An image coder for coding at least one image comprising:
    an image processor configured to:
        receive at least one image captured by an image-capturing device,
        decorrelate the image by applying thereto a mathematical transform so as to obtain a set of coefficients, and decompose the image into blocks and, for each block of the image,
    a dead-zone uniform scalar quantizer of semi-dead zone of size T and of quantization step size $\Delta$ for quantizing said coefficients, and
    a source coder for coding the quantized coefficients to produce a compressed image,
    the size T of the semi-dead zone of the scalar quantizer being determined by minimizing a difference between an estimated quantization distortion D(T), dependent at least on said size T, and a target quantization distortion $D_c$.

15. A satellite comprising an image coder according to claim 14.

16. The satellite according to claim 6 further comprising a transmitter for transmitting to ground coded quantized coefficients and/or the size T of a coded semi-dead zone and/or a coded parameter $\alpha$.

17. A computer program comprising instructions stored on a tangible non-transitory storage medium for executing, on a processor, an image compression method comprising the following steps applied to at least one image:
- receiving at least one image captured by an image-capturing device,
- decorrelating the image by applying thereto a mathematical transform so as to obtain a set of coefficients, and
- decomposing the image into blocks and, for each block of the image,
- quantizing said coefficients using a dead-zone uniform scalar quantizer having a semi-dead zone of size T and a quantization step size $\Delta$, and
- coding the quantized coefficients to produce a compressed image,
- the size T of the semi-dead zone of the scalar quantizer being determined by minimizing a difference between an estimated quantization distortion D(T), dependent at least on said size T, and a target quantization distortion $D_c$, when the program is executed by the processor.

18. A tangible non-transitory processor readable recording medium on which is stored a program comprising instructions for executing an image compression method comprising the following steps applied to at least one image:
- receiving at least one image captured by an image-capturing device,
- decorrelating the image by applying thereto a mathematical transform so as to obtain a set of coefficients, and
- decomposing the image into blocks and, for each block of the image,
- quantizing said coefficients using a dead-zone uniform scalar quantizer having a semi-dead zone of size T and a quantization step size $\Delta$, and
- coding the quantized coefficients to produce a compressed image,
- the size T of the semi-dead zone of the scalar quantizer being determined by minimizing a difference between an estimated quantization distortion D(T), dependent at least on said size T, and a target quantization distortion $D_c$, when the program is executed by a processor.

* * * * *